United States Patent Office 2,772,507
Patented Dec. 4, 1956

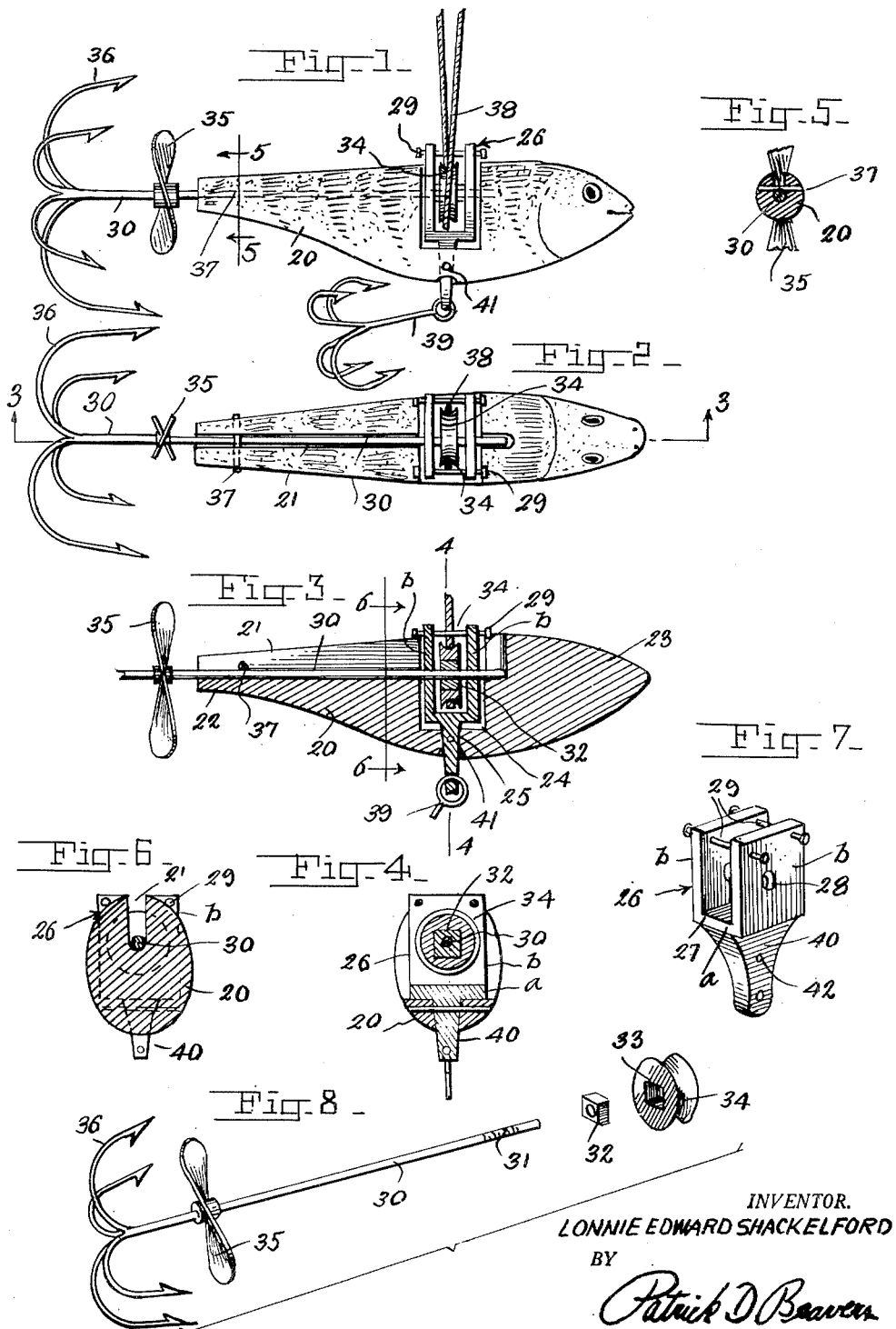

2,772,507

FISH LURE

Lonnie Edward Shackelford, Lancaster, Calif.

Application July 8, 1955, Serial No. 520,727

2 Claims. (Cl. 43—26.2)

This invention relates to improvements in fish lures and is a continuation-in-part of my co-pending application Serial No. 428,290, filed May 7, 1954, now abandoned.

The principal object of the present invention is to provide a fish lure having a body structure of animated appearance and capable of readily attracting fish to be caught.

Another object of the invention is to provide a fish lure having normal propulsion means capable of being readily actuated to cause the lure to perform various antics in the water to attract sport fish.

In the drawing:

Figure 1 is a side elevational view of the lure.

Figure 2 is a top plan view.

Figure 3 is a fragmentary sectional view taken on line 3—3 of Figure 2.

Figure 4 is a cross-section taken on line 4—4 of Figure 3.

Figure 5 is a fragmentary sectional view taken substantially on line 5—5 of Figure 1.

Figure 6 is a fragmentary sectional view taken on line 6—6 of Figure 3.

Figure 7 is a perspective view of the bearing structure.

Figure 8 is an exploded perspective view showing the propeller shaft, hooks, nut and propeller.

Referring to the drawing wherein like numerals designate like parts, numeral 20 denotes a body structure simulating a fish bait, such as a minnow. This is constructed of metal and has a channel 21 extending forwardly from its reduced tail portion 22, terminating rearwardly of the head portion 23 of the body.

Extending downwardly into the body 20 from the channel 21 located at about the center of gravity of the body, is a well 24 and a passage 25 is formed, extending downwardly through the bottom surface to the well 24.

Numeral 26 generally refers to a bearing structure, which consists of a U-shaped formation 27 having a bottom $a$ and vertical sidewalls $b$, each having an opening 28. The upper corners of the walls $b$ are bridged by pins 29.

Numeral 30 denotes an elongated shaft having a threaded portion 31 to accommodate a square nut 32, which is adapted to fit within a squared axial opening 33 in a pulley 34.

The rear portion of the shaft 30 is provided with a screw type propeller 35 and the rear end has a plurality of hooks 36.

A cross pin 37 is provided at the rear portion of the body 20 across the channel 21 and serves to prevent lifting of the shaft 37 within the channel.

The bight of a fishing line 38 can be trained about the pulley 34 as shown in Figure 1 and by alternately pulling on one side and the other, the shaft 30 can be caused to rotate and correspondingly, the propeller 35 will be rotated, in one direction and then the other, to cause the lure to perform various antics contemplated to attract sport fish.

A hook assembly 39 is attached to the bearing structure 26, which has a depending tapered leg 40, extending downwardly through the passage 25, and below the belly of the lure, and substantially to the extent shown in Figure 1.

There is a pin 41 disposed through the belly portion of the lure and through the leg 40, at the opening 42, to prevent upward displacement of the bearing assembly 26.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A fish lure comprising a body, a shaft disposed in the body and provided with a propeller thereon, said shaft being provided with a fish hook, and means for rotating the shaft, said body being of solid construction and having a channel extending downwardly from the top to accommodate said shaft.

2. A fish lure comprising a body, a shaft disposed in the body and provided with a propeller thereon, said shaft being provided with a fish hook, and means for rotating the shaft; said body being of solid construction and having a channel extending downwardly from the top to accommodate said shaft, and a pin disposed through the body and across the channel above said shaft to prevent displacement of the latter.

References Cited in the file of this patent

UNITED STATES PATENTS

| | | |
|---|---|---|
| 543,479 | Harrison et al. | July 30, 1895 |
| 1,495,927 | Roland | May 27, 1924 |
| 1,627,512 | Hughes et al. | May 3, 1927 |
| 1,850,296 | Vermeulen | Mar. 22, 1932 |
| 2,281,831 | Courvelle | May 5, 1942 |